United States Patent [19]

Aklonis et al.

[11] Patent Number: 5,134,177

[45] Date of Patent: Jul. 28, 1992

[54] CONDUCTING COMPOSITE POLYMER BEADS AND METHODS FOR PREPARATION AND USE THEREOF

[75] Inventors: John J. Aklonis, San Pedro; Gia Y. Kim, La Verne, both of Calif.

[73] Assignee: University of Southern California, Los Angeles, Calif.

[21] Appl. No.: 694,629

[22] Filed: May 2, 1991

[51] Int. Cl.[5] .......................... C08L 79/02; B32B 27/02; H01B 1/12

[52] U.S. Cl. .................... 523/201; 252/500; 428/407; 525/902

[58] Field of Search .................. 252/500; 428/407; 523/201; 525/902

[56] References Cited

U.S. PATENT DOCUMENTS

| | | | |
|---|---|---|---|
| 4,604,427 | 8/1986 | Roberts et al. | 252/500 |
| 4,636,430 | 1/1987 | Moehwald | 428/304.4 |
| 4,724,053 | 2/1988 | Jasne | 264/239 |
| 4,752,528 | 6/1988 | Oka | 428/407 |
| 4,832,869 | 5/1989 | Cotts | 252/500 |
| 4,956,239 | 9/1990 | Meijer et al. | 428/411.1 |

FOREIGN PATENT DOCUMENTS 0021456  2/1982  Japan .................... 252/500
WO83/02954  9/1983  World Int. Prop. O.

Primary Examiner—Paul R. Michl
Assistant Examiner—Peter Szekely
Attorney, Agent, or Firm—Robbins, Dalgarn, Berliner & Carson

[57] ABSTRACT

Composite conducting polymer particles are described, wherein surface-treated supporting polymer particles having a charged surface of a first polarity are provided with a coating of conducting polymer of opposite polarity applied to the surface thereof. Suitably, the supporting insulating polymer particles are subjected to a surface treatment which introduces charged moieties thereon. The conducting polymer may be doped with at least one dopant to improve its conductivity. The novel particles have desirable rheological properties, and particularly when admixed with at least one processible polymer may be used to prepare products comprising conductive polymers in a particularly facile manner.

19 Claims, 1 Drawing Sheet

PPV PRECURSOR I     PSSA BEADS

PPV PRECURSOR II     PSSA BEADS

PDPV PRECURSOR III     PSSA BEADS

CONDUCTIVE FORM
EMERALDINE SALT     PSSA BEADS

PPV PRECURSOR I    PSSA BEADS

PPV PRECURSOR II    PSSA BEADS

PDPV PRECURSOR III    PSSA BEADS

CONDUCTIVE FORM
EMERALDINE SALT    PSSA BEADS

CONDUCTING COMPOSITE POLYMER BEADS AND METHODS FOR PREPARATION AND USE THEREOF

BACKGROUND OF THE INVENTION

The present invention relates to the field of polymer chemistry. In particular, the present invention relates to composite polymer beads comprising at least one conductive polymer and methods for the preparation and use thereof.

Polymers containing conjugated unsaturated systems have been the focus of considerable attention due to their ability to conduct electricity. Doped polyacetylene, the first well-characterized and studied conducting polymer, exhibits conductivity values as high as $10^5$ S/cm (a value comparable to metal conductors). Various other conductive polymers have been identified and characterized, including polyphenylene vinylene (PPV) [Lenz, R. W. et al., *J. Polym. Sci., Part A, Polym. Chem. Ed.* 26:3241 (1988); Gagnon D. R. et al., *Polymer.* 28:567 (1987)], polydimethoxyphenylene vinylene (PDPV) [Antoun, S. et al., *J. Polym. Sci., Part A. Polym. Chem. Ed.* 26:1809 (1988)]and polyaniline (PA) [Cao, Y. et al., *Polymer* 30:2305 (1989)].

Organic polymer conductors display a wide range of conductivities, unlike common metal conductors. In addition, these polymeric materials have additional advantages relative to metal conductors which stem from their properties as polymers. Thus, typical conducting polymers exhibit superior strength-to-weight ratios. Moreover, the long term stability of the polymers themselves in some environments provides an additional advantage relative to metal conductors.

A significant obstacle which has heretofore limited the utilization of conducting polymers has been their lack of processibility. As the polymers are highly unsaturated, they tend to be both infusible and insoluble in most solvents. This makes shaping of the polymers by conventional techniques difficult. Moreover, the air stability of some conducting polymers after doping is also a problem. Thus, there is a need to develop processible conducting polymer compositions, as well as conducting polymer compositions which are more stable in air.

U.S. Pat. No. 4,636,430 to Moehwald describes composite materials consisting of a porous material and an electrically conductive polymer. The surfaces of the pores are first coated with a layer of an electrically conductive polymer obtained by treating polymer-forming monomers (generally, compounds from the class consisting of 5-membered heterocyclic compounds which possess a conjugated pi-electron system and contain nitrogen, sulfur or oxygen as heteroatoms) with an oxidizing agent in the presence of a conductive salt.

U.S. Pat. No. 4,724,053 to Jasne describes a method for the production of a processible electrically conductive organic polymer which comprises electropolymerizing an electropolymerizable monomer onto an anode in an electrolytic medium. The polymeric electrode has anionic surface character for affiliation with the cationic electropolymerized polymer on the anode; it is processed from a polymer material comprising an oxidatively polymerized polymer having cationic character in affiliation with a polymeric counterion particle having anionic surface character. The electropolymerized polymer and the anode on which it is formed are processed together by shaping them or size reducing them and dispersing the resultant size reduced material into a liquid vehicle for production of a coatable composition.

PCT published application WO 83/02954 (Ventrex Laboratories) describes solid polystyrenes and copolymers thereof with divinylbenzene which are derivatized on their surfaces with negatively charged sulfonate groups or with such groups followed by positively charged polyalkylamines. Adhesion proteins or other substances of like function, such as various unidentified serum proteins, are then covalently attached thereto, using 1-ethyl-3-(dimethylaminopropyl) carbodiimide or activation with glutaraldehyde followed by treatment with cyanoborohydride to reduce the unstable aminealdehyde addition product. The proteins are associated either with cellular anchorage dependence or immunogen anchorage. The coated materials are used as carriers for cell cultures or as substrata for solid state immunological reactions.

It is an object of the present invention to provide compositions comprising conducting polymers which are more processible and yet stable in air.

It is a further object of the present invention to provide methods for the preparation and use of conducting polymer compositions.

SUMMARY OF THE INVENTION

In accordance with the present invention, composite conducting polymer particles are provided which comprise a supporting polymer in particulate form having applied thereto a coating of conducting polymer. A preferred supporting polymer is monodisperse crosslinked polystyrene. Preferred conducting polymers include PPV, PDPV and polyaniline.

Pursuant to the present invention, the novel composite particles are prepared by treating the surface of supporting polymer particles so as to provide a charged surface. The thus-treated beads are then added to a solution of a conducting polymer or soluble precursors thereof with a charge opposite to that of the supporting polymer particles. This results in the formation of discrete particles comprising supporting polymer coated with conducting polymer or precursor. The thus-coated particle is conductive or may be rendered conducting upon subsequent treatment (such as heating) and/or where appropriate, chemical doping. Pursuant to a preferred embodiment of the invention, monodisperse crosslinked polystyrene beads are rendered anionic by treatment with $SO_3$ above fuming sulfuric acid to sulfonate the bead surfaces, followed by treatment with dilute solutions of cationically-charged polymers and/or polymer precursors.

BRIEF DESCRIPTION OF THE DRAWING

The invention may be better understood with reference to the accompanying drawing, in which.

DETAILED DESCRIPTION OF THE INVENTION

Figure 1:
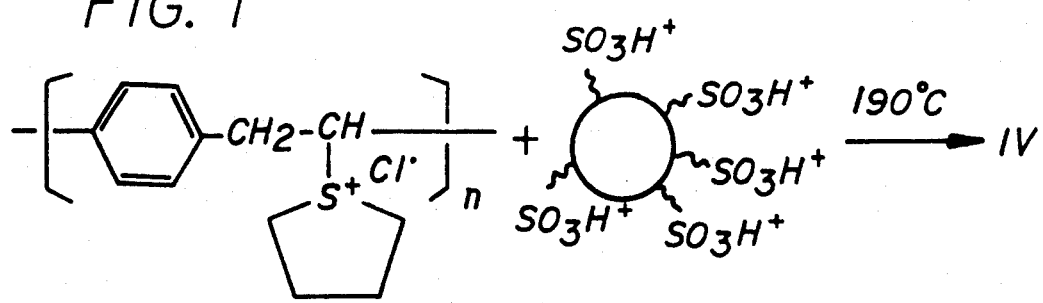
FIG. 1 illustrates synthetic routes for the preparation of composite beads comprising polystyrene coated with conducting polymer.
Figure 1:
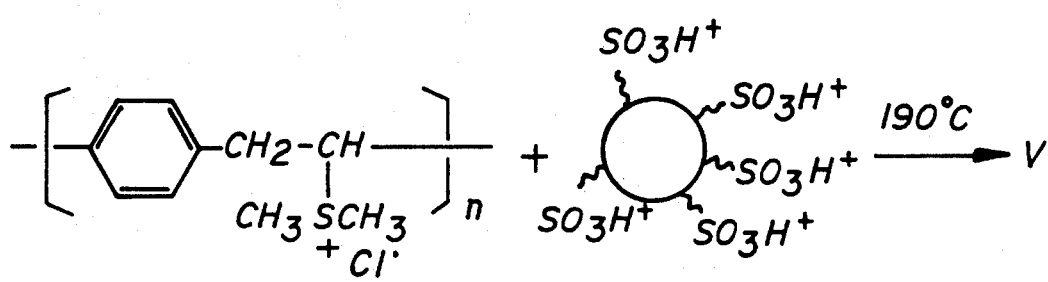
Figure 1:
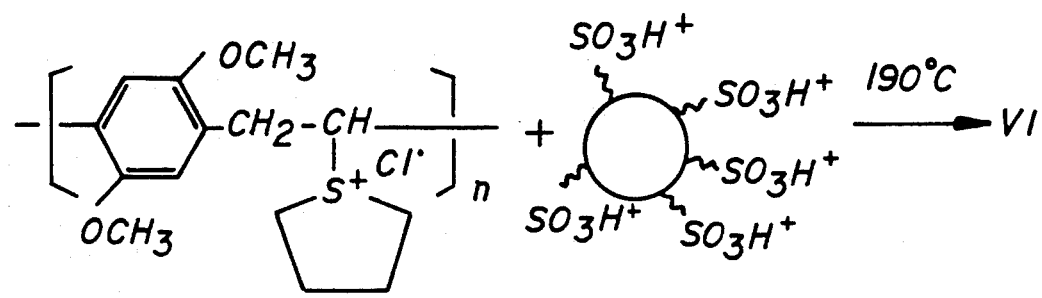
Figure 1:
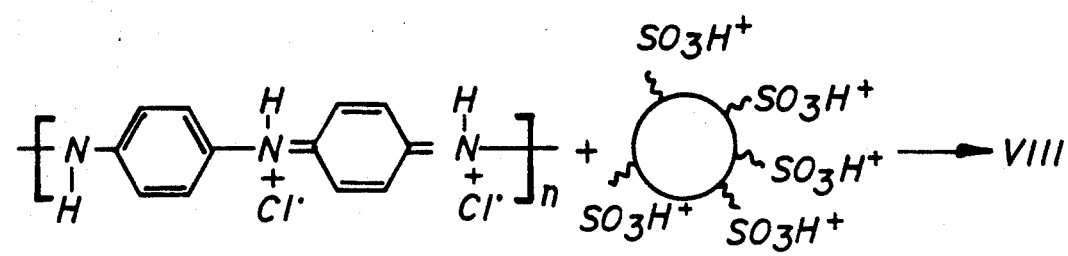

Pursuant to the present invention, composite polymer systems are provided in which particles of ordinary insulating polymers are treated so as to result in the formation of particulates comprising conducting polymers in a particularly useful formulation. The composite particles in effect provide the conductive polymer in a form which may suitably be used in a manner as has heretofore been conventional for other types of particulate materials, such as fillers, in ordinary processing techniques. In particular, the composite particles have a well-defined shape and size, enabling control and predictability of rheological properties.

On account of their desirable rheological properties, the particles may be used directly for the preparation of products comprising conducting polymer. Alternatively, the composite polymer particles may advantageously be admixed with a processible polymer (in solution or in a solid, typically particulate, form) to provide mixtures which may then be employed to prepare final products using techniques which heretofore were not suitable for use with the conducting polymer alone. For purposes of the present invention, a processible polymer is an insulating polymer which may be employed in the manufacture of products using methods conventional in the polymer processing field (e.g., pressure or injection molding). In general, any processible polymer may be admixed with the composite polymer particles of the invention to provide a processible, conductive mixture. When the composite polymer particles comprise a conducting polymer which is advantageously treated with a suitable dopant, the conducting polymer may be doped prior to admixing with the processible polymer; however, in some cases it may be preferable to introduce the dopant only after a mixture of the composite polymer particles and the processible polymer has been prepared, or the mixture has been processed into a desired shape.

The relative proportions of composite polymer particles and processible polymer may be varied over a fairly wide range. To provide a mixture having suitable processing characteristics, a significant portion of the mixture must comprise the processible polymer. On the other hand, the electrical properties of the product, in particular its conductivity, depend upon the amount of composite polymer particles present. In general, mixtures comprising from about 5% to about 70% by weight of composite polymer particles are suitable for use in accordance with the present invention.

Any number of different types of supporting polymers may be utilized to prepare composite polymer particles in accordance with the present invention. The particle size may be varied within a fairly broad range. Preferred particle sizes are those wherein the maximum dimension of the particle is in the range of about 100 Angstroms to about 1 mm, preferably about 0.1 microns to about 10 microns, most preferably about 0.2 microns to about 1.2 microns. Although typically the supporting polymer particles are spherical in shape, for particular uses other shapes (e.g., fibers or rods) may be employed and are clearly contemplated as within the scope of the particulates of the present invention.

A major consideration as to the utility of any supporting polymer is whether the supporting polymer particles may be treated to render the surface thereof ionic (i.e., so as to provide a plurality of charged sites thereon). In general, suitable surface treatments involve reacting the supporting polymer particles with one or more agents which activate the surface of the polymers so as to provide free anionic or cationic sites and/or introduce anionic or cationic moieties thereon. As the majority of known conducting polymers form cationic solutions, in general the supporting polymer particles are treated so as to introduce moieties which render the particle surfaces anionic in solution.

Suitable supporting polymers for use in accordance with the invention include polymers derived from monomers containing at least one functional group which, after a suitable treatment, provides a free anionic or cationic moiety. Examples of this type of supporting polymer include unsubstituted or substituted acrylates (such as methacrylate) and copolymers comprising such acrylates, which when treated with a suitable acid are hydrolyzed to provide free COO groups. Other supporting polymers of this type include polymers containing amine groups.

Another category of supporting polymer for use in accordance with the present invention includes those materials with surfaces onto which anionic or cationic moieties may be introduced by a suitable chemical reaction. Examples of such polymers include polystyrene and copolymers derived from mixtures comprising styrene monomers. Ionic groups which may be introduced onto the surface of suitable polymers by methods known per se (including, for example, treatments in suitable solutions or with gaseous reactants) include carboxylic, sulfonic, sulfinic, phosphoric, phosphinic, nitronic, arsenic and boronic groups.

In accordance with a preferred embodiment of the invention, the supporting polymer particles comprise crosslinked polystyrene beads. Particularly preferred are monodisperse beads; however, for some uses, polydisperse beads may alternatively be employed. The beads are known per se and are commercially available, for example, from Polyscience, Warrington, Pa. The beads are typically available in sizes in the fractional micron range. Polystyrene beads, when added to processible polymers, have well understood and predictable rheological properties.

Pursuant to a preferred embodiment of the invention, the surface of the polystyrene beads is rendered anionic by treating them with $SO_3$ above fuming sulfuric acid. This treatment sulfonates the bead surface, and is preferred in that the swelling of the beads that occurs in solution is avoided; although the size of typical beads prepared by this method increases slightly (e.g., on the order of about 20 nm), the monodispersity of the beads is maintained. Of course, in those instances where swelling of the supporting polymer particles would not be a serious disadvantage or would be less likely to occur, known solution treatments for introducing moieties which exhibit a net surface charge when the particles are subsequently introduced into a solution of the conducting polymer or precursor thereof may alternatively be employed.

Pursuant to the method of one aspect of the invention, the thus-treated supporting polymer particles exhibiting ionic surfaces are introduced into a solution comprising a conducting polymer or precursor thereof with a charge opposite to that of the particle surface. In principle, a wide variety of conducting polymers and/or precursors thereof may be employed in accordance with the present invention. Examples of such conducting polymers and precursors thereof include the polymers and precursors disclosed in U.S. Pat. No. 4,832,869 to Cotts and U.S. Pat. No. 4,724,053 to Jasne, the entire disclosures of which are hereby incorporated by reference, as well as in the polymers and precursors described in the references cited therein. In general, conducting polymers are an art-recognized class of materials which by virtue of their chemical structure have a backbone which permits charge conduction. In particular, a wide variety of different conducting polymers are known which comprise recurring units of acetylene or aromatic, substituted aromatic or heteroaromatic rings systems, optionally with connecting units (such as —CH=CH— or —N=CH—) which are suitable for the formation of extended conjugated systems. Exemplary conducting polymers of this type include various substituted and unsubstituted derivatives of p-phenylene or p-phenylene sulfide, polyphenylene vinylenes, polypyrroles, polythiophenes, polyazulenes, polyfurans, polyanilines, polyindoles, polycarbazoles, polyazepines, polybenzidines and polyazomethines. Suitable substituents for the monomers include alkyl, aryl, aralkyl, hydroxy, alkoxy, halo, amino and nitro groups. In addition, polymers derived from mixtures of two or more monomers may be suitable for use as conducting polymers in accordance with the present invention. Another class of polymers suitable for use in accordance with the present invention are phthalocyaninatometal polymers in which the central metal is a transition metal and the organic bridging ligands contain delocalized pi-electrons (e.g., pyrazine or 4,4'-bipyridine). Yet another class of known conducting polymers includes bridge-stacked phthalocyanines or metallophthalocyanines, where pi-orbital overlap occurs at the phthalocyanine rings. For use with the preferred polystyrene beads having sulfonated (and thus, anionically-charged) surfaces, aqueous solutions of cationically-charged conducting polymer or precursors thereof are advantageously employed. In general, polymers which exhibit a conductivity of at least about $10^{-4}$ S/cm are suitable for use in accordance with the present invention, as are precursors thereof.

One class of preferred cationically-charged polymer precursors includes precursors to PPV and PDPV. According to the heretofore known methods, bis-sulphonium salt monomers are polymerized to a water-soluble sulphonium salt polyelectrolyte precursor which can subsequently easily be converted to PPV or PDPV by thermal elimination. Upon doping with a suitable dopant (e.g., $AsF_5$), these polymers exhibit metal-like conductivities. PDPV has greater stability relative to PPV and also may be doped under milder conditions. Other suitable dopants for use with these and other conducting polymers amenable to doping include, but are not limited to, the following exemplary species: $PF_6^-$, $ClO_4^-$, $AsF_6^-$, $BF_4^-$, $SbF_6^-$, $SbCl_6^-$, $SO_3CF_3^-$, $NO_3^-$, $POF_4^-$, $CN^-$, $F^-$, $Cl^-$, $Br^-$, $I^-$, $I_3^-$, $SiF_5^-$, $HSO_4^-$, acetate, benzoate, tosylate, brosylate and mixtures thereof.

Another preferred conductive polymer for use in accordance with the present invention is polyaniline. Polyaniline has a wide range of attractive electrical, electrochemical and optical properties; moreover, polyaniline exhibits good stability. Both the salt and the base forms of polyaniline are soluble at room temperature up to polymer concentrations of greater than 20% w/w in several concentrated strong protonic acids. Thus, using $H_2SO_4$ as a solvent, solutions of cationic polyaniline salt have been prepared and used for the coating of sulfonated beads. As the polyaniline-coated beads do not require chemical doping to be electrically conductive and are stable indefinitely in air, these beads are particularly preferred in accordance with the present invention.

The invention may be better understood with reference to the accompanying examples, which are intended for purposes of illustration only.

EXAMPLES

EXAMPLE 1

Preparation of Sulfonated Polystyrene Beads

Monodisperse crosslinked polystyrene beads (453 nm) were synthesized via emulsifier-free emulsion polymerization [Zou, D. et al., *J. Polym. Sci. Polym. Chem.* 28:1909 (1990), the entire disclosure of which is hereby incorporated by reference]. The PS beads were then sulfonated in the gas phase using an enclosed glass chamber. Within the chamber, a small glass container held the PS beads above fuming sulfuric acid (containing 16–24% $SO_3$) in the bottom of the larger glass chamber. Slow continuous rotation for three days at room temperature exposed all the beads. The white PS beads became yellowish after this treatment. The sulfonated beads were washed with distilled water several times and dried in a vacuum oven at room temperature for four days.

X-ray Photoelectron Spectroscopy (VG Scientific ESCALAB MKII instrument) and Auger (Perkin Elmer) analysis were used to analyze the surfaces of the sulfonated beads. Elemental analysis (controlled Equipment Corporation 240XA at 970° C.) was done on Oneida Research Services. The degree of sulfonation of the PSSA beads was obtained from elemental analysis, XPS and Auger analysis. Assuming sulfonation of each phenyl ring in a PS bead, the elemental composition (by mass) would be 52.2% C, 4.3% H, 26.1% O and 17.4% S. Elemental analysis results were 84.72% C, 7.60% H, 4.59% O and 2.89% S, which indicated that about one in every eight monomer units was sulfonated. Auger analysis confirmed the presence of sulfur and oxygen on the bead surfaces. XPS analysis, which ignores hydrogens, showed the elemental atomic composition to be 92.8% C, 6.0% O and 1.2% S. This technique also showed a trace of oxygen on the surface of "pure" PS beads, which was probably due to a modest amount of surface oxidation. The unexpected 5 to 1 oxygen to sulfur ratio is probably due to this complication.

EXAMPLE 2

Preparation of PPV Coated Beads

Two different PPV precursor polymers I and II [poly(xylylidene tetrathiophenium chloride) and poly(p-xylylene-α-dimethylsulphonium chloride), respectively] were used to coat the sulfonated PS beads prepared according to Example 1. PPV precursors I and II were prepared as described in the above-noted Lenz et al. and Gagnon et al. articles, respectively; the entire disclosures of these articles are also hereby incorporated by reference. The elemental analysis of the bis-sulphonium monomers and the infrared spectra of the PPV films obtained from I and II were found to agree with published data.

Sulfonated PS beads were mixed with aqueous 0.2 M PPV precursor I by stirring for 30 minutes at room temperature. Small aggregates were dispersed either by mechanical agitation or sonication. The mixture was then filtered and dried in a vacuum oven at room temperature for 4 days. The resulting slightly yellowish beads were heated to 190° C. for 3 days under vacuum and turned yellow; this was taken as an indication of the formation of composite PPV polymer beads IV (FIG. 1).

The composite beads were then pressed between polytetrafluoroethylene (PTFE) sheets in a hydraulic press at 170° C. and 2500 lb. for 20 minutes to form a pellet. Two pressed pellets were doped with AsF$_5$ at approximately 100 torr for various periods of time and conductivities were measured. These measurements were done in air immediately after removal of the samples from the doping chamber and utilized a Keithley Model 197 Auto-ranging Microvolt DMM connected to an Alessi C4S and C4R 4-Point Probe.

The same synthetic procedure was employed with precursor II to form composite polymer beads V, except that the doping period was longer (20 days). After measuring the conductivity in the manner previously described, the sample was exposed to the laboratory atmosphere for 24 hours and its conductivity remeasured. This doped pellet was then broken into small pieces and repressed in a hydraulic press at 150° C. and 2500 lb for 15 minutes. It was subsequently redoped with AsF$_5$ for 4 days at 100 torr.

The fractured surfaces of pellets made from beads IV and V were observed by SEM (Cambridge Instruments) and the distribution of As in a sample doped for 8 days was determined via EDXS (Cambridge Instruments). The diameters of the beads increased from about 450 nm before coating to close to 520 nm. The SEM clearly showed that the beads retained their integrity and the PPV appeared to be reasonably uniformly coated on their surfaces. EDXS showed the presence of arsenic atoms throughout the fractured surface.

The thermal elimination temperatures needed to form PPV from I and II are quite different. Precursor II was used in an attempt to make conducting composite beads; complete thermal elimination was impossible due to the high elimination temperature required to form PPV from II, as PSSA beads decompose at the relatively modest temperature of 300° C. Elimination at temperatures lower than optimal prevented formation of a fully conjugated PPV polymer. Total elimination was possible for precursor I. From the data in Table 1, we observe that it was easier to dope IV than V; furthermore, higher conductivities were observed with longer doping times. The spatial heterogeneity of the conductivity of the pellets made from V was considerable (measured conductivities varied by about an order of magnitude).

When V was exposed to laboratory air for one day, its conductivity decreased by less than an order of magnitude. Upon repressing at 150° C., the conductivity dropped to below $10^{-8}$ S/cm. Subsequent redoping appeared to be more facile than the original doping.

A comparison of the properties of neat PPV films and conducting composite beads is interesting. The conductivity of a PPV film made from precursor I was $1.8 \times 10^{-2}$ S/cm after doping for 8 days at 100 torr. The conductivity of the pellet prepared from the same precursor doped and measured under identical conditions was $2.4 \times 10^{-4}$ S/cm (Table 1). The decreased conductivity for the beads was probably due to gaps between the beads. Also, as expected, the conductivities increased as the doping period increased from 6 to 8 days for IV.

TABLE 1

| Conductivity measurements of PPV/PSSA composite beads | | | |
| --- | --- | --- | --- |
| Composite beads | Time of doping (days) | Thickness of pellet (cm) | Conductivity (S/cm) |
| IV | 6 | 0.043 | $5.1 \times 10^{-5}$ |
| | 6 | 0.043 | $1.2 \times 10^{-5}$ |
| | 8 | 0.059 | $2.4 \times 10^{-4}$ |
| V | 12 | 0.051 | below $10^{-8}$ |
| | 20 | 0.051 | $1.4 \times 10^{-1}$ to $5.7 \times 10^{-2}$ |
| | 20a | 0.051 | $1.1 \times 10^{-2}$ |
| | 20b | 0.051 | $2.0 \times 10^{-4}$ |

$^a$exposed to air for one day
$^b$repressed in hydraulic press then redoped for 4 days

EXAMPLE 3

Preparation of PDPV Coated Beads

The synthesis of the PDPV precursor, poly(2,5-dimethoxy-1,4-xylene-α-dimethylsulfonium chloride) was carried out as described in the above-noted Antoun et al. article, the entire disclosure of which is hereby incorporated by reference. The bead coating procedure was identical to that of Example 2, except that doping was carried out over solid I$_2$ at room temperature for 12 days.

Unlike PPV, PDPV can be doped with I$_2$ rather than AsF$_5$. The conductivity of PDPV coated PS beads was lower than that observed for PPV coated beads. After 12 days of doping, the conductivity was on the order of about $10^{-5}$ S/cm.

EXAMPLE 4

Preparation of PA Coated Beads

Polyaniline was synthesized according to a reported procedure [Cao, Y. et al., Polymer. 31:2305 (1989), the entire disclosure of which is hereby incorporated by reference]. Reagent-grade aniline was vacuum distilled before use; 40 ml of this aniline in a three necked round bottom flask was added to 460 ml of 1N HCl. The oxidant solution, 190 ml of 1.5 N HCl and 50 g of (NH$_4$)$_2$S$_2$O$_8$ was added slowly from a dropping funnel while stirring the mixture at $-5°$ C. The reaction mixture was stirred for 4 hours. The precipitated polyaniline was collected from the reaction vessel, filtered and then washed with distilled water until the water became colorless. Subsequently, the precipitated polyaniline was washed with several portions of methanol followed by diethyl ether. The washed polyaniline was dried in a vacuum oven at room temperature for 5 days. Dried polyaniline was extracted with tetrahydrofuran (THF) using a Soxhlet extractor followed by washing with methanol and ether. The polyaniline was again dried in the vacuum oven at room temperature for 5 days. It was added to water and then converted to its basic form with NH$_4$OH. Reprotonation with HCl followed.

The polyaniline synthesized in this way was dissolved in concentrated sulfuric acid and sulfonated polystyrene beads were added. The mixture was stirred for 1 hour at room temperature. The mixture was then filtered and the composite beads were washed with water in several portions. The green colored beads were dried in a vacuum for several days. The conductivities of the polyaniline-coated beads were measured after pressing the bead powder at room temperature at 1000 lbs. for 30 minutes with a hydraulic press.

Unlike the PPV and PDPV coated beads, the PA coated beads did not require chemical doping to conduct. In addition, PA coated beads are stable in air indefinitely. The conductivities of composite beads based on PA were lower than those prepared with PPV, as shown in Table 2. The low conductivities observed were possibly due to uneven coverage of the surfaces of the beads, which was seen in SEM pictures showing aggregates (presumably of PA) on the beads surfaces. It is probable that because PA exists both in reduced and oxidized states, uncharged portions of the PA did not bind well in this instance to the sulfonated bead surface. It is expected that higher conductivity would result from better coverage, which can be realized by such modifications as more complete surface charging or higher charging of the PA. The smooth coverage observed with PPV and PDPV is consistent with the fact in these cases every monomer unit of the chain contains a charge which can interact with the anionic beads.

TABLE 2

Conductivity measurements of PA/PSSA composite beads

| Composite beads | Thickness of Pellet (cm) | Conductivity (S/cm) |
| --- | --- | --- |
| PA/PSSA (VIII) | 0.069 | $1.85 \times 10^{-5}$ |
|  | 0.075 | $2 \times 10^{-3}$ to $1.2 \times 10^{-4}$ |
| PA | 0.088 | $3 \times 10^0$ to $4 \times 10^0$ |

While the invention has been described with reference to exemplary embodiments thereof, it should be noted by those skilled in the art that the disclosures are exemplary only and that various other alternatives, adaptations and modifications may be made within the scope of the present invention. Accordingly, the present invention is not limited to the specific embodiments as illustrated herein, but only by the following claims.

What is claimed is:

1. A composite conducting polymer particle, comprising
   a surface-treated supporting polymer particle having a charged surface of a negative polarity; and
   a coating of conducting polymer of positive polarity applied to the surface thereof.

2. A composite conducting polymer particle according to claim 1, wherein the surface of the surface-treated supporting polymer particle is substituted with at least one charged moiety.

3. A composite conducting polymer particle according to claim 2, wherein the charged moiety is selected from the group consisting of carboxylic, sulfonic, sulfinic, phosphoric, phosphinic, nitronic, arsenic and boronic groups.

4. A composite conducting polymer particle according to claim 1, wherein the surface-treated supporting polymer particle is a sulfonated crosslinked polystyrene bead.

5. A composite conducting polymer particle according to claim 1, wherein the conducting polymer is selected from the group consisting of unsubstituted and substituted derivatives of p-phenylene and p-phenylene sulfide, polyphenylene vinylenes, polypyrroles, polythiophenes, polyazulenes, polyfurans, polyanilines, polyindoles, polycarbazoles, polyazepines, polybenzidines, polyazomethines, phthalocyaninatometal polymers and bridge-stacked phthalocyanines and metallophthalocyanines.

6. A composite conducting polymer particle according to claim 1, wherein the conducting polymer is doped.

7. A composite conducting polymer particle according to claim 1, wherein the dopant is selected from the group consisting of $PF_6^-$, $ClO_4^-$, $AsF_6^-$, $BF_4^-$, $SbF_6^-$, $SbCl_6^-$, $SO_3CF_3^-$, $NO_3^-$, $POF_4^-$, $CN^-$, $F^-$, $Cl^-$, $Br^-$, $I^-$, $I_3^-$, $SiF_5^-$, $HSO_4^-$, acetate, benzoate, tosylate, brosylate and mixtures thereof.

8. A composite conducting polymer particle according to claim 1, comprising a sulfonated monodisperse crosslinked polystyrene bead coated with polyaniline.

9. A method for preparing a composite conducting polymer particle, comprising:
   treating a particle comprising a supporting polymer so as to introduce a surface charge of a negative polarity on a surface thereof; and
   coating said particle with a conducting polymer of positive polarity.

10. A method according to claim 9, wherein said treating comprises substituting the surface of the particle with at least one charged moiety.

11. A method according to claim 10, wherein said charged moiety is selected from the group consisting of carboxylic, sulfonic, sulfinic, phosphoric, phosphinic, nitronic, arsenic and boronic groups.

12. A method according to claim 9, further comprising:
    treating the coated polymer with at least one dopant to increase the conductivity of the conducting polymer.

13. A method according to claim 12, wherein the dopant is selected from the group consisting of $PF_6^-$, $ClO_4^-$, $AsF_6^-$, $BF_4^-$, $SbF_6^-$, $SbCl_6^-$, $SO_3CF_3^-$, $NO_3^-$, $POF_4^-$, $CN^-$, $F^-$, $Cl^-$, $Br^-$, $I^-$, $I_3^-$, $SiF_5^-$, $HSO_4^-$, acetate, benzoate, tosylate, brosylate and mixtures thereof.

14. A method according to claim 9, wherein the particle comprising a supporting insulating polymer is a monodisperse polystyrene bead and said treating comprises sulfonating the surface of the bead.

15. A method according to claim 14, wherein said sulfonating comprises treatment with $SO_3$ above fuming sulfuric acid.

16. A method according to claim 9, wherein the conducting polymer is selected from the group consisting of unsubstituted and substituted derivatives of p-phenylene and p-phenylene sulfide, polyphenylene vinylenes, polypyrroles, polythiophenes, polyazulenes, polyfurans, polyanilines, polyindoles, polycarbazoles, polyazepines, polybenzidines, polyazomethines, phthalocyaninatometal polymers and bridge-stacked phthalocyanines and metallophthalocyanines.

17. A method for preparing a product comprising a conducting polymer, said method comprising:
    coating at least one conducting polymer having a positive polarity onto surface-treated supporting polymer particles having a charged surface of negative polarity, to provide composite conducting polymer particles;
    admixing said composite conducting polymer particles with at least one processable polymer to form a mixture; and
    forming said mixture into said product.

18. A method according to claim 16, wherein the surface-treated supporting polymer particles comprise sulfonated monodisperse polystyrene beads.

19. A method according to claim 17, further comprising:
    doping said conducting polymer with at least one dopant to increase the conductivity of the conducting polymer.

* * * * *

UNITED STATES PATENT AND TRADEMARK OFFICE
CERTIFICATE OF CORRECTION

PATENT NO. : 5,134,177
DATED : July 28, 1992
INVENTOR(S) : Aklonis et al.

It is certified that error appears in the above-identified patent and that said Letters Patent is hereby corrected as shown below:

Col. 1, after line 11, please insert the following paragraph:

--This invention was made with Government support under Contract N00014-88-K-0302 awarded by the Department of the Navy. The Government has certain rights in the invention.--

Signed and Sealed this

Twenty-fourth Day of August, 1993

Attest:

BRUCE LEHMAN

*Attesting Officer*     *Commissioner of Patents and Trademarks*